United States Patent
Koumoto

(10) Patent No.: US 8,869,414 B2
(45) Date of Patent: Oct. 28, 2014

(54) REFERENCE SETTING TOOL FOR MEASURING SHAPE OF SIDE FACE SPLINE, SHAPE MEASURING DEVICE USING THE SAME, AND SHAPE MEASURING METHOD USING THE SAME

(75) Inventor: Masashi Koumoto, Yao (JP)

(73) Assignee: Jtekt Corporation, Osaka (JP)

( * ) Notice: Subject to any disclaimer, the term of this patent is extended or adjusted under 35 U.S.C. 154(b) by 329 days.

(21) Appl. No.: 13/562,962

(22) Filed: Jul. 31, 2012

(65) Prior Publication Data

US 2013/0047451 A1    Feb. 28, 2013

(30) Foreign Application Priority Data

Aug. 31, 2011    (JP) ................................ 2011-188900

(51) Int. Cl.
| | | |
|---|---|---|
| G01B 5/12 | (2006.01) | |
| G01B 5/008 | (2006.01) | |
| G01B 5/16 | (2006.01) | |
| G01B 21/04 | (2006.01) | |
| G01B 5/00 | (2006.01) | |

(52) U.S. Cl.
CPC ............... *G01B 5/166* (2013.01); *G01B 5/008* (2013.01); *G01B 21/042* (2013.01); *G01B 5/003* (2013.01); *Y10S 33/14* (2013.01)
USPC ..................................... 33/501.7; 33/DIG. 14

(58) Field of Classification Search
USPC ................ 33/501.7, DIG. 14, 501.13, 501.15
See application file for complete search history.

(56) References Cited

U.S. PATENT DOCUMENTS

| | | | | |
|---|---|---|---|---|
| 4,583,295 | A * | 4/1986 | Gresock et al. | 33/501.7 |
| 6,598,305 | B1 * | 7/2003 | McKinney et al. | 33/501.7 |
| 8,512,157 | B2 * | 8/2013 | Harada et al. | 464/178 |
| 2008/0148893 | A1 | 6/2008 | Langer et al. | |
| 2008/0175526 | A1 | 7/2008 | Langer et al. | |
| 2008/0240635 | A1 | 10/2008 | Niebling et al. | |
| 2010/0038958 | A1 * | 2/2010 | Tsuzaki et al. | 301/125 |
| 2013/0047451 | A1 * | 2/2013 | Koumoto | 33/501.7 |

FOREIGN PATENT DOCUMENTS

| | | |
|---|---|---|
| JP | A-2008-174178 | 7/2008 |
| JP | A-2008-536737 | 9/2008 |
| JP | A-2010-179327 | 8/2010 |

OTHER PUBLICATIONS

Dec. 4, 2012 Extended Search Report issued in European Patent Application No. 12179454.9.

* cited by examiner

*Primary Examiner* — Yaritza Guadalupe-McCall
(74) *Attorney, Agent, or Firm* — Oliff PLC

(57) ABSTRACT

A reference setting tool for measuring a shape of a side face spline is used to measure the shape of driven teeth that are formed on an axial end face of a vehicle hub unit and that are meshed with drive teeth of a constant velocity joint. The reference setting tool includes: reference teeth that are formed so as to be aligned along a circular ring and so as to have the same shape as the drive teeth of the constant velocity joint; and a reference surface that has a predetermined correlation with the reference teeth, and that is used to set a reference position for measuring the shape of the driven teeth with the reference teeth in mesh with the driven teeth.

20 Claims, 7 Drawing Sheets

OUTER SIDE
IN VEHICLE LATERAL DIRECTION

INNER SIDE
IN VEHICLE LATERAL DIRECTION

REFERENCE SETTING TOOL FOR MEASURING SHAPE OF SIDE FACE SPLINE, SHAPE MEASURING DEVICE USING THE SAME, AND SHAPE MEASURING METHOD USING THE SAME

INCORPORATION BY REFERENCE

The disclosure of Japanese Patent Application No. 2011-188900 filed on Aug. 31, 2011 including the specification, drawings and abstract, is incorporated herein by reference in its entirety.

BACKGROUND OF THE INVENTION

1. Field of the Invention

The invention relates to a reference setting tool used to measure the shape of driven teeth (spline teeth) of a side face spline formed on a vehicle hub unit, a shape measuring device using the reference setting tool, and a shape measuring method using the reference setting tool.

2. Description of Related Art

A hub unit is used to support a wheel of an automobile such that the wheel is rotatable with respect to a suspension. There is a known hub unit in which a side face spline having driven teeth (spline teeth) to be meshed with drive teeth, formed on an outer ring of a constant velocity joint, is formed on an axially inner end face (an end face on the inner side in the vehicle lateral direction) of a hub wheel to which a drive wheel is fitted (refer to, for example, Published Japanese Translation of PCT Application No, 2008-536737 (JP 2008-536737 A) and Japanese Patent Application Publication No. 2008-174178 (JP 2008-174178 A)). In the hub unit, torque of a drive shaft of an automobile is transmitted from the constant velocity joint to the hub wheel via the driven teeth.

The driven teeth of the above-described side face spline need to satisfy predetermined accuracy requirements for various dimensions such as a tooth flank size, an arrangement pitch and a coaxiality with respect to the rotation center, in order to appropriately mesh the driven teeth with the drive teeth of the constant velocity joint. Therefore, after a hub unit is manufactured, an inspection process is carried out. In the inspection process, for example, a three-dimensional measuring device is used to measure various dimensions of the driven teeth, and whether predetermined accuracies are achieved is checked.

The shape of the driven teeth of the side face spline is usually designed using a pitch surface when the driven teeth are in mesh with the drive teeth of the constant velocity joint, as a reference surface (e.g. an imaginary plane indicated by the long dashed double-short dashed line α in FIG. 2; hereinafter, also referred to as "design reference surface"). However, because the design reference surface is just an imaginary plane, the design reference surface cannot be used to measure the shape of the driven teeth of an actual product in the inspection process. Therefore, in related art, various dimensions of spline teeth are measured using a worked surface, such as a flange surface and a wheel fitting surface of a hub wheel, as a temporary reference surface. However, this increases measurement errors, which makes it difficult to stably carry out accurate dimension measurement.

SUMMARY OF THE INVENTION

It is an object of the invention to provide a reference setting tool for measuring the shape of a side face spline, a side face spline shape measuring device using the reference setting tool, and a side face spline shape measuring method using the reference setting tool, which make it possible to set an appropriate reference for measuring the shape of driven teeth.

An aspect of the invention relates to a reference setting tool for measuring the shape of a side face spline, which is used to measure the shape of driven teeth that are formed on an axial end face of a vehicle hub unit and that are meshed with drive teeth of a constant velocity joint. The reference setting tool includes; reference teeth that are formed so as to be aligned along a circular ring and so as to have the same shape as the drive teeth of the constant velocity joint; and a reference surface that has a predetermined correlation with the reference teeth, and that is used to set a reference position for measuring the shape of the driven teeth with the reference teeth in mesh with the driven teeth.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
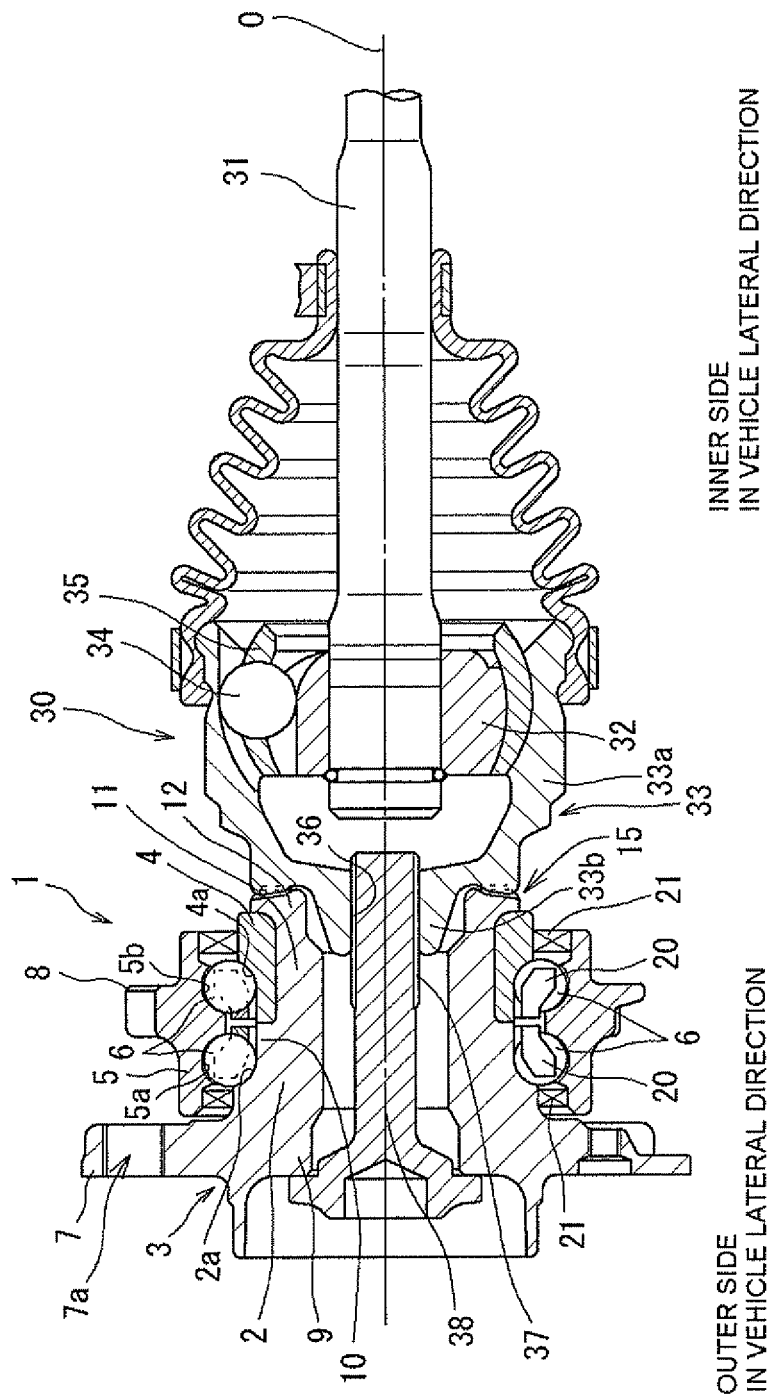
FIG. 1 is a sectional view that shows a vehicle hub unit according to an embodiment of the invention.
Figure 2:
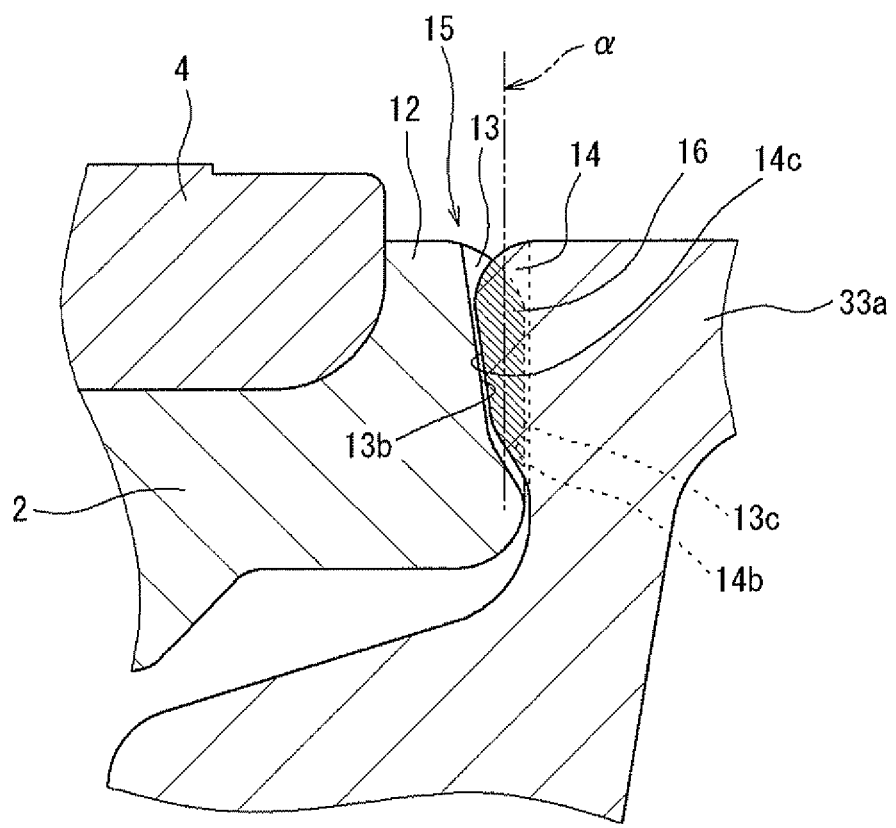
FIG. 2 is an enlarged sectional view of a clinched portion of the vehicle hub unit shown in FIG. 1.

Hereafter, an embodiment of the invention will be described in detail with reference to the accompanying drawings. FIG. 1 is a sectional view that shows a vehicle hub unit according to the embodiment of the invention. FIG. 2 is an enlarged sectional view of a clinched portion of the vehicle hub unit. The vehicle hub unit 1 supports a wheel of an automobile such that the wheel is rotatable with respect to a suspension. The vehicle hub unit 1 includes a hub wheel 3, an inner ring member 4, an outer ring 5, and a plurality of rolling elements 6. The hub wheel 3 has a cylindrical hub spindle 2. The inner ring member 4 is fixed to an inner end portion, in the vehicle lateral direction (right end portion in FIG. 1), of the hub spindle 2 through clinching. The outer ring 5 is arranged radially outward of the hub spindle 2. The rolling elements 6 are rollably arranged between outer ring raceways 5a, 5b that are formed on the inner periphery of the outer ring 5 and inner ring raceways 2a, 4a that are formed on the outer periphery of the hub spindle 2 and the outer periphery of the inner ring member 4, respectively. The rolling elements 6 are retained by a cage 20 at predetermined intervals in the circumferential direction. In addition, seal members 21 are provided in an annular clearance formed between the outer ring 5 and the hub wheel 3. The seal members 21 close the annular clearance at respective axial ends.

A flange 7 is formed at an outer end portion in the vehicle lateral direction (left end portion in FIG. 1), of the hub wheel 3. The flange 7 has holes 7a into which bolts (not shown) are fitted. For example, a wheel of a tire and a brake disc are fitted to the flange 7 with the bolts. A fixing flange 8 is formed on the outer periphery of the outer ring 5. The fixing flange 8 is used to fit the hub unit 1 to a vehicle body member (not shown) supported by the suspension of the vehicle.

The hub spindle 2 is a single-piece member that has a large-diameter portion 9 and a small-diameter portion 11. The large-diameter portion 9 is formed on the flange 7-side. The small-diameter portion 11 is smaller in diameter than the large-diameter portion 9, and is contiguous with the large-diameter portion 9 via a step 10. The inner ring raceway 2a is formed on the outer periphery of the large-diameter portion 9. The inner ring raceway 2a corresponds to the outer ring raceway 5a of the outer ring 5.

The inner ring member 4 is fitted to the outer periphery of the small-diameter portion 11 of the hub spindle 2, and end portion of the small-diameter portion 11 is then clinched. As a result, the inner ring member 4 is fixed between the step 10 and a clinched portion 12 of the small-diameter portion 11.

Torque of a drive shaft 31 is transmitted to the hub unit 1 via a constant velocity joint 30. The constant velocity joint 30 shown in the drawing is a Birfield constant velocity joint. The constant velocity joint 30 includes an inner ring 32, an outer ring 33, a plurality of balls 34, and a cage 35. The inner ring 32 is securely fitted to one end of the drive shaft 31. The outer ring 33 is arranged radially outward of the inner ring 32. The balls 34 are arranged between the inner ring 32 and the outer ring 33. The cage 35 retains the balls 34.

The outer ring 33 of the constant velocity joint 30 has a generally bowl-shaped outer ring cylindrical portion 33a and an outer ring shaft portion 33b. The outer ring shaft portion 33b extends from the center portion of an end face of the outer ring cylindrical portion 33a. The outer ring shaft portion 33b has a hole 36 that extends in the axial direction. The inner periphery of the outer ring shaft portion 33b, which defines the hole 36, has an internal thread. An external thread 37 of a cap bolt 38 is screwed to the internal thread of the outer ring shaft portion 33b. The hub unit 1 is connected to the constant velocity joint 30 with the cap bolt 38.

As shown in FIG. 2, a side face spline 15 having a plurality of driven teeth (spline teeth) 13 is formed on an end face of the clinched portion 12 of the inner end portion, in the vehicle lateral direction, of the hub spindle 2. The driven teeth 13 are formed so as to radiate from the axis O (see FIG. 1) of the hub unit 1 while being aligned along a circular ring centering on the axis O. Multiple drive teeth 14 are formed on an end face of the outer ring cylindrical portion 33a, which faces the clinched portion 12. The drive teeth 14 radiate from the axis of the outer ring 33 while being aligned along a circular ring centering on the axis of the outer ring 33. Due to the mesh of the driven teeth 13 and the drive teeth 14, torque of the drive shaft 31 is transmitted to the hub unit 1 via the constant velocity joint 30. Note that, the hatched region in FIG. 2 shows a meshing portion 16 at which the driven tooth 13 and the drive tooth 14 of the outer ring cylindrical portion 33a are in mesh with each other. In addition, in FIG. 2, the tip and the root of the driven tooth 13 are denoted by 13c and 13b, respectively, and the tip and the root of the drive tooth 14 are denoted by 14c and 14b, respectively.

The number of the driven teeth 13 is, for example, 37, and the number of the drive teeth 14 is equal to the number of the driven teeth 13. The pitch surface (pitch line) $\alpha$ is set at a position at which the driven teeth 13 and the drive teeth 14 are in mesh with each other. The dimensions of a tooth flank, a tooth trace, and the like, of each of the driven teeth 13 and the drive teeth 14 are designed using the pitch surface $\alpha$ as a reference, and the driven teeth 13 and the drive teeth 14 are formed by closed die forging.

The hub unit 1 on which the side face spline 15 is formed is subjected to the inspection process after manufacturing. In the inspection process, various dimensions, such as the tooth flank shape, tooth trace and pitch of the driven teeth 13 are measured, and then whether these dimensions satisfy predetermined accuracies is checked. The dimensions such as the tooth flank shape of each driven tooth 13 of the side face spline 15 are set using the pitch surface $\alpha$ (see FIG. 2) as a reference surface in design. However, the reference surface $\alpha$ (hereinafter, also referred to as "design reference surface") is just an imaginary plane, so dimension measurement cannot be carried out using the design reference surface $\alpha$ as a reference in the inspection process. Therefore, in the present embodiment, in order to set an appropriate reference surface (measurement reference surface) that is an alternative to the design reference surface $\alpha$, a reference setting tool 50 described below is used.

Figure 3:
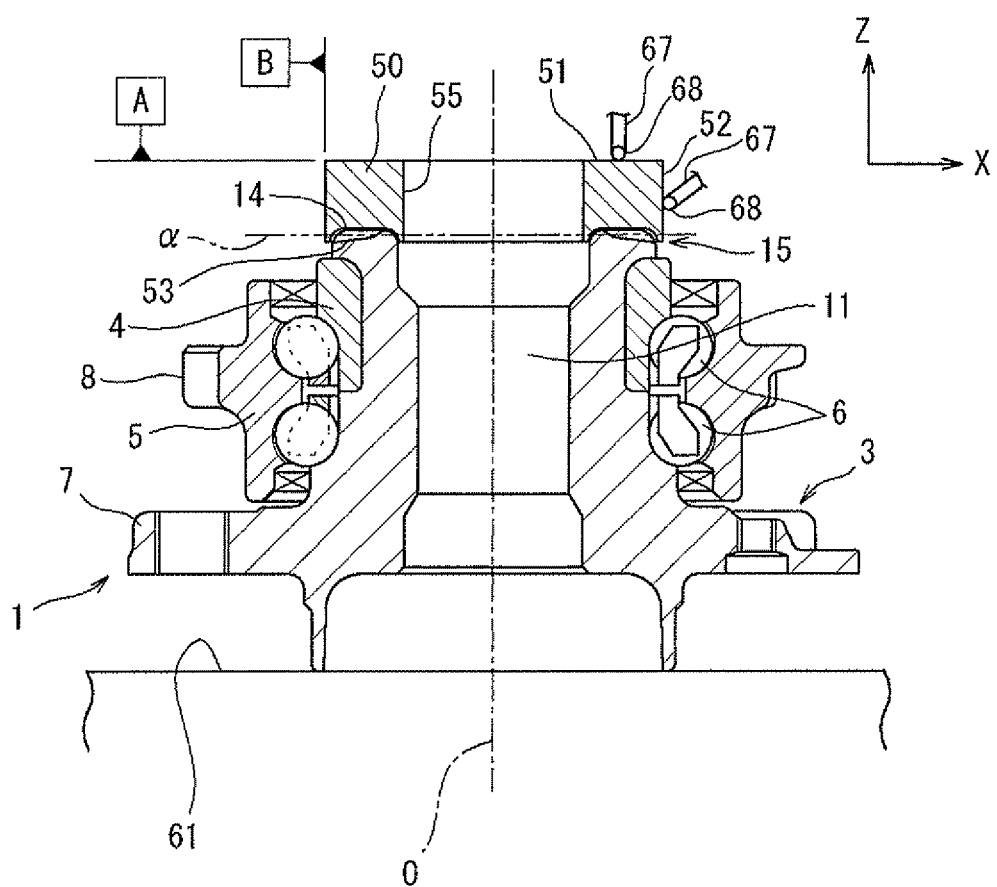
FIG. 3 is a sectional explanatory view of the vehicle hub unit, showing a state where measurement reference positions for driven teeth of an end portion of the clinched portion shown in FIG. 2 are set.
Figure 4:
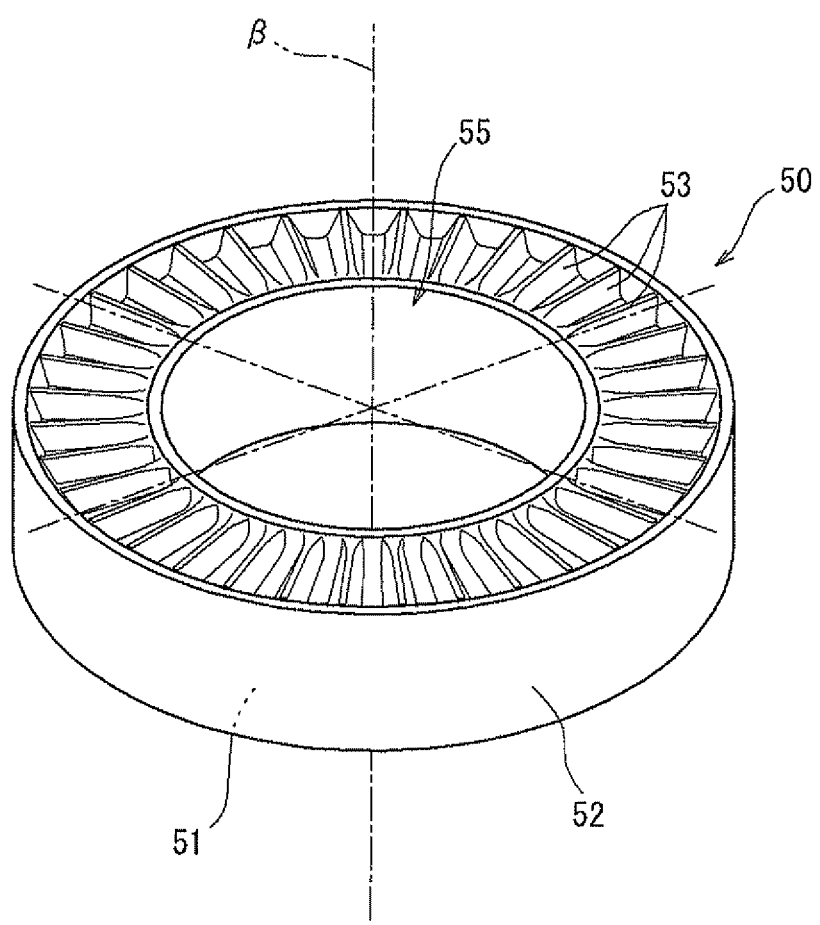
FIG. 4 is a perspective view of a reference setting tool.

FIG. 3 is a sectional explanatory view of the vehicle hub unit, showing a state where the measurement reference surfaces for the driven teeth shown in FIG. 2 are set. FIG. 4 is a perspective view of the reference setting tool 50. The reference setting tool 50 is formed of an annular block, and has a plurality of reference teeth 53 on one end face in the direction along the central axis $\beta$ thereof (bottom face of the reference setting tool 50 in FIG. 3). The reference teeth 53 are formed in imitation of the shape of the drive teeth 14 of the constant velocity joint 30, and are formed to have completely the same shape as the drive teeth 14 with dimensions that satisfy predetermined accuracies. Thus, at the reference teeth 53 as well, an imaginary design reference surface $\alpha$ as shown in FIG. 2 is set, and the reference teeth 53 are formed to have accurate dimensions, using the design reference surface $\alpha$ as a reference. In addition, the reference teeth 53 are aligned along the circular ring centering on the central axis $\beta$ with a coaxiality that satisfies a predetermined accuracy. In addition, a hole 55 is formed along the central axis $\beta$ of the reference setting tool 50.

The other end face of the reference setting tool 50 in the direction along the central axis $\beta$ (top face of the reference setting tool 50 in FIG. 3) is formed into a flat face. The other end face is perpendicular to the central axis $\beta$ with a predetermined accuracy, and is formed parallel to the design reference surface $\alpha$ for the reference teeth 53 with a predetermined accuracy. The other end face of the reference setting tool 50 constitutes a first reference surface 51 that is used to measure the dimensions of the driven teeth 13.

In addition, an outer periphery 52 of the reference setting tool 50 is formed in a cylindrical surface about the central axis $\beta$. In addition, the outer periphery 52 of the reference setting tool 50 is formed with a coaxiality and a circularity with respect to the central axis $\beta$ with predetermined accuracies. The outer periphery 52 of the reference setting tool 50 constitutes a second reference surface that is used to measure the dimensions of the driven teeth 13.

Figure 5:
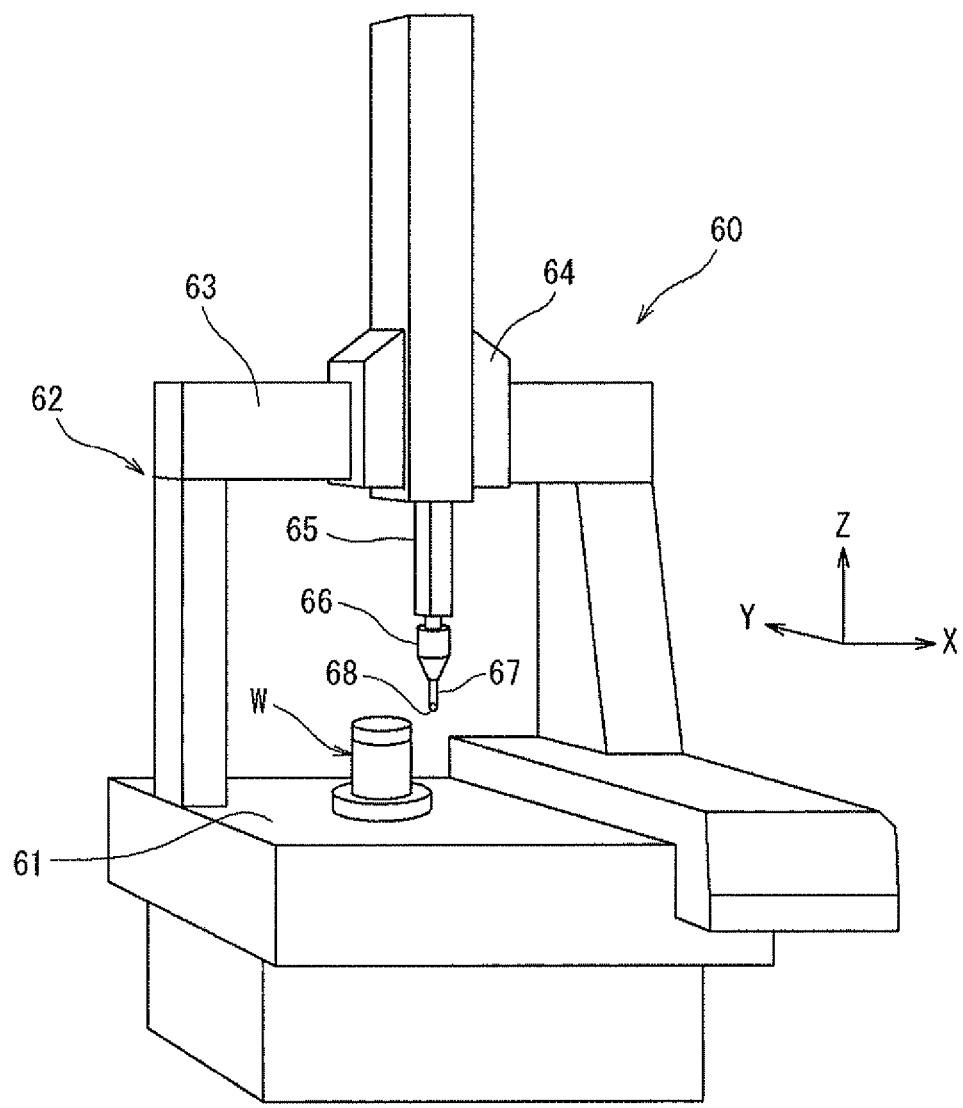
FIG. 5 is a perspective view of a measuring device.

To measure the dimensions of the driven teeth 13 of the side face spline 15 of the hub unit 1, the hub unit 1 is set on a three-dimensional measuring machine 60 (an example of a measuring unit according to the invention) with the reference teeth 53 of the reference setting tool 50 in mesh with the driven teeth 13. As shown in FIG. 5, the three-dimensional measuring machine 60 includes a surface plate 61, a portal frame 62, a slider 64, an elevating shaft 65, and a probe 67. The distal end of the probe 67 has a spherical gauge head 68.

The portal frame 62 is provided so as to be movable in the longitudinal direction (Y direction) of the surface plate 61. The slider 64 is provided so as to be movable in the lateral direction (X direction) along a horizontal beam 63 of the portal frame 62. The elevating shaft 65 is provided on the slider 64 so as to be elevatable in the vertical direction (Z direction). The probe 67 is attached to the lower end of the elevating shaft 65 via a holder 66.

The three-dimensional measuring machine 60 sequentially brings the gauge head 68 into contact with measured portions of a workpiece W while moving the probe 67 in three-dimensional directions (XYZ directions) to measure coordinate values at each contact point. Various dimensions of the workpiece W are obtained by computing the measured coordinate values. The three-dimensional measuring machine 60 may be a conventional commercially available machine.

In the present embodiment, as shown in FIG. 3, the hub unit 1 to which the reference setting tool 50 is attached is set on the surface plate 61, as the workpiece W. The gauge head 68 of the probe 67 is brought into contact with the first reference surface 51 and second reference surface 52 of the reference setting tool 50 to measure the coordinates of the first reference surface 51 and second reference surface 52. The first reference surface 51 and the second reference surface 52 are set as measurement reference surfaces (measurement reference positions) A and B at the time of measuring the dimensions of the driven teeth 13.

Subsequently, the reference setting tool 50 is removed from the hub unit 1 on the surface plate 61, and then the gauge head 68 of the probe 67 is brought into contact with the driven teeth 13 of the side face spline 15 to measure various dimensions, such as the tooth flank, tooth trace and pitch of the driven teeth 13. At this time, the coordinates of the contact point at which the gauge head 68 contacts the driven teeth 13 are coordinates with reference to the measurement reference surfaces A and B respectively set by the first reference surface 51 and the second reference surface 52.

The first reference surface 51 of the reference setting tool 50 is parallel to the design reference surface α (see FIG. 2) of the reference teeth 53, and is formed at a predetermined distance from the design reference surface α. Therefore, by meshing the reference teeth 53 of the reference setting tool 50 with the driven teeth 13 of the hub unit 1, the design reference surface α of the driven teeth 13 is replaced with the first reference surface 51 that is just shifted from the design reference surface α by a predetermined amount in the Z direction. The first reference surface 51 is used as the measurement reference surface A, and the shape of the driven teeth 13 is measured using the measurement reference surface A as a reference. In this way, further accurate measurement is possible, and it is possible to accurately check whether various dimensions of the driven teeth 13 satisfy the predetermined accuracies.

In addition, the second reference surface 52 is used as the measurement reference surface B. In this way, the position (coordinates) of the central axis β (see FIG. 4) of the reference teeth 53 is obtained. When the reference teeth 53 are meshed with the driven teeth 13, the central axis β corresponds to the central axis of the driven teeth 13 in design. Therefore, by measuring the dimensions of the driven teeth 13 with respect to the central axis β, it is possible to accurately obtain the coaxiality, and the like, of the driven teeth 13 with respect to the imaginary central axis.

The above-described measurement is carried out over all the driven teeth 13 of the side face spline 15, and is precise measurement that requires a certain period of time. Therefore, the above measurement is preferably carried out not over all the products but as sampling inspection in which part of products having the same model number are sampled and subjected to inspection. Further, 100% inspection in which all the products are subjected to inspection may be simply carried out with the use of the reference setting tool 50 according to a measuring method described below.

Figure 6:
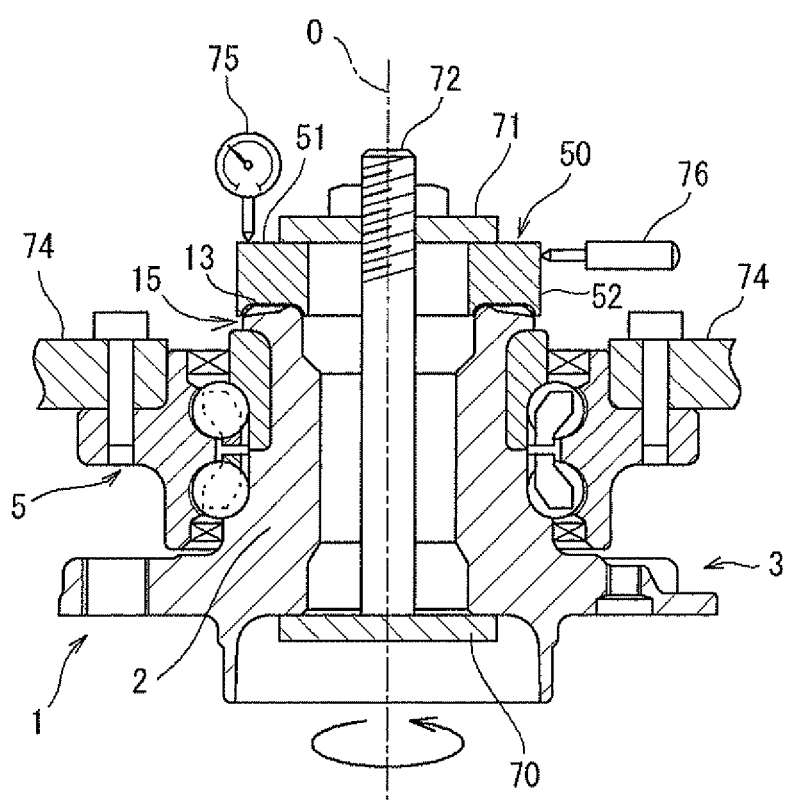
FIG. 6 is a sectional explanatory view of the vehicle hub unit, showing a state where dimension measurement is carried out using the reference setting tool.
Figure 7:
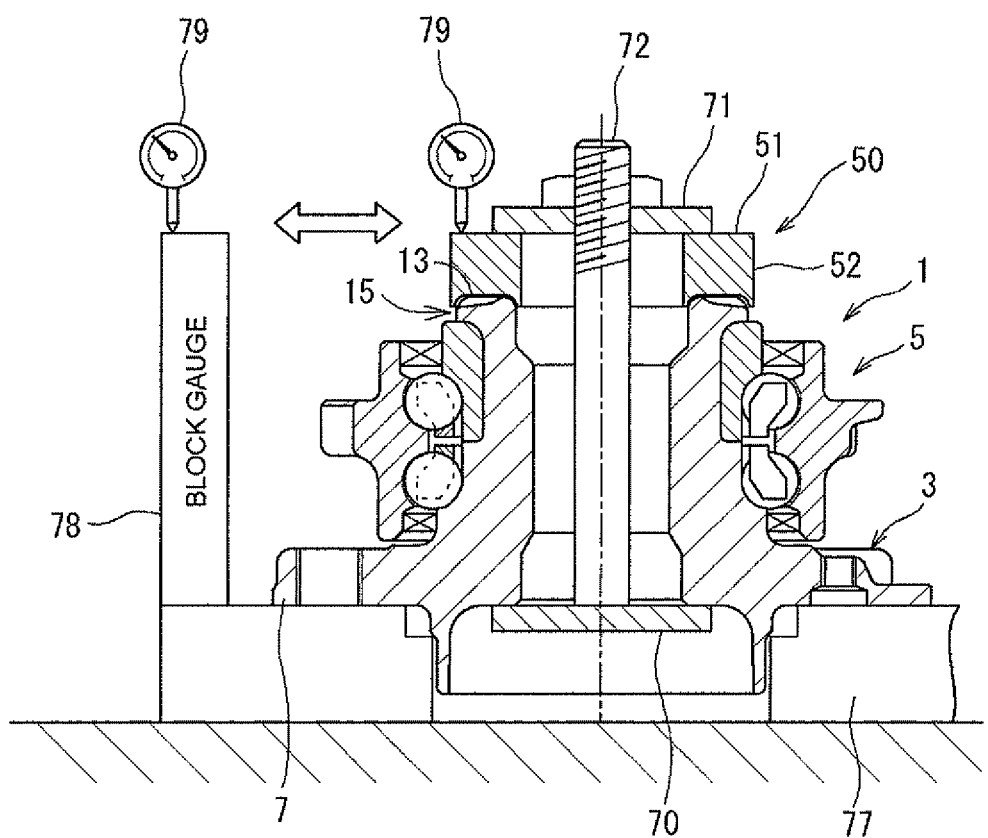
FIG. 7 is a sectional explanatory view of the vehicle hub unit, showing a state where dimension measurement is carried out using the reference setting tool.

FIG. 6 and FIG. 7 are sectional explanatory views of the vehicle hub unit, showing the measuring method in which the reference setting tool is set as a measuring object. In the measuring method shown in FIG. 6 and FIG. 7, the dimensions of the driven teeth 13 are not directly measured unlike in the above-described measuring method, and the reference setting tool 50, meshed with the driven teeth 13, is set as a measuring object.

For the side face spline 15 of the hub unit 1, several guaranteed items are set in order to accurately fit the side face spline 15 to the drive teeth 14 of the constant velocity joint 30. The guaranteed items are, for example, the runout of the driven teeth 13 in the direction along the axis O with respect to the outer ring 5 when the hub wheel 3 is rotated, the coaxiality (radial runout) of the driven teeth 13 with respect to the axis O of the hub wheel 3 in the same situation, the runout of the driven teeth 13 in the height direction with respect to the surface of the flange 7 of the hub wheel 3. In order to inspect these guaranteed items, the measuring method shown in FIG. 6 and FIG. 7 are executed.

First, as shown in FIG. 6, the reference setting tool 50 is fixed to the hub unit 1 with the reference setting tool 50 in mesh with the side face spline 15 of the hub unit 1. In the present embodiment, the hub wheel 3 and the reference setting tool 50 are held by a pair of clamping plates 70 and 71 coupled with a bolt 72. Then, the outer ring 5 of the hub unit 1 is fixed to a fixing member 74.

Then, the hub wheel 3 is rotated one turn about the axis O with measuring tools 75 and 76, such as dial gauges, in contact with the first reference surface 51 and second reference surface 52 of the reference setting tool 50, respectively. In this way, the reference setting tool 50 also rotates one turn in accordance with the hub wheel 3, and the runout of the first reference surface 51 and the runout of the second reference surface 52 are respectively measured by the measuring tools 75 and 76. The runout of the first reference surface 51 corresponds to the runout of the driven teeth 13 in the direction along the axis O with respect to the outer ring 5 (the runout of the reference surface α). In addition, the runout of the second reference surface 52 corresponds to the runout of the driven teeth 13 in the radial direction with respect to the rotation center (axis O) of the hub wheel 3 (coaxiality).

In addition, as shown in FIG. 7, the flange 7 of the hub wheel 3 of the hub unit 1 to which the reference setting tool 50 is fixed is placed on a rotary base 77. Then, a block gauge 78 is adjusted to the size that is obtained by adding the height of the reference setting tool 50 (distance from the design reference surface α of the reference teeth 53 to the first reference surface 51) to the height from the flange 7 to the reference surface α for the driven teeth 13 in design, and is placed on the rotary base 77. Then, a change in the height of the first reference surface 51 of the reference setting tool 50 at the time when the rotary base 77 is rotated one turn about the axis O is compared by a measuring tool 79, such as a dial gauge, with the height of the block gauge 78 to measure the runout of the design reference surface α for the driven teeth 13, which is replaced with the first reference surface 51.

Therefore, in the measuring method shown in FIG. 6 and FIG. 7, even when the driven teeth 13 are not directly measured, it is possible to carry out inspection on the specific guaranteed items by measuring the first reference surface 51 and second reference surface 52 of the reference setting tool 50.

The invention is not limited to the above-described embodiment, and various modifications may be made as needed within the scope of the invention recited in the appended claims. For example, the reference setting tool 50 according to the above embodiment has two reference surfaces, that is, the first reference surface 51 and the second reference surface 52. Alternatively, the reference setting tool 50 may have only one of the first reference surface 51 and the second reference surface 52. In addition, as long as a reference surface has a predetermined correlation with the reference teeth 53, the reference surface may be other than the above-described first and second reference surfaces 51 and 52.

According to the invention, an appropriate reference is set in order to measure the shape of the driven teeth to thereby make it possible to carry out accurate measurement.

What is claimed is:

1. A reference setting tool for measuring a shape of a side face spline, the reference setting tool being used to measure a shape of driven teeth that are formed on an axial end face of a vehicle hub unit and that are meshed with drive teeth of a constant velocity joint, comprising:
    reference teeth that are formed so as to be aligned along a circular ring and so as to have the same shape as the drive teeth of the constant velocity joint; and
    a reference surface that has a predetermined correlation with the reference teeth, and that is used to set a reference position for measuring the shape of the driven teeth with the reference teeth in mesh with the driven teeth.

2. The reference setting tool according to claim 1, wherein the reference surface of the reference setting tool includes a first reference surface that is perpendicular to a central axis that is a center of the circular ring along which the reference teeth are aligned.

3. The reference setting tool according to claim 2, wherein the reference surface of the reference setting tool includes a second reference surface formed of a cylindrical surface centering on a central axis that is a center of the circular ring along which the reference teeth are aligned.

4. The reference setting tool according to claim 3, wherein the reference surface is utilized as a measured surface of which a shape is measured by a measuring tool with the driven teeth in mesh with the drive teeth of the constant velocity joint.

5. A shape measuring device for a side face spline, the shape measuring device measuring a shape of driven teeth that are formed on an axial end face of a vehicle hub unit and that are meshed with drive teeth of a constant velocity joint, comprising:
    the reference setting tool according to claim 3; and
    a measuring unit that sets a measurement reference position using the reference surface with the reference teeth of the reference setting tool in mesh with the driven teeth of the vehicle hub unit, and that measures a shape of the driven teeth using the measurement reference position as a reference.

6. A shape measuring method for a side face spline, for measuring a shape of driven teeth that are formed on an axial end face of a vehicle hub unit and that are meshed with drive teeth of a constant velocity joint, characterized by comprising:
    meshing the reference teeth of the reference setting tool according to claim 3 with the driven teeth of the vehicle hub unit;
    setting a measurement reference position using the reference surface of the reference setting tool; and
    removing the reference setting tool from the vehicle hub unit, and measuring a shape of the driven teeth using the measurement reference position as a reference.

7. The reference setting tool according to claim 2, wherein the reference surface is utilized as a measured surface of which a shape is measured by a measuring tool with the driven teeth in mesh with the drive teeth of the constant velocity joint.

8. A shape measuring device for a side face spline, the shape measuring device measuring a shape of driven teeth that are formed on an axial end face of a vehicle hub unit and that are meshed with drive teeth of a constant velocity joint, comprising:
    the reference setting tool according to claim 7; and
    a measuring unit that sets a measurement reference position using the reference surface with the reference teeth of the reference setting tool in mesh with the driven teeth of the vehicle hub unit, and that measures a shape of the driven teeth using the measurement reference position as a reference.

9. A shape measuring device for a side face spline, the shape measuring device measuring a shape of driven teeth that are formed on an axial end face of a vehicle hub unit and that are meshed with drive teeth of a constant velocity joint, comprising:
    the reference setting tool according to claim 2; and
    a measuring unit that sets a measurement reference position using the reference surface with the reference teeth of the reference setting tool in mesh with the driven teeth of the vehicle hub unit, and that measures a shape of the driven teeth using the measurement reference position as a reference.

10. A shape measuring method for a side face spline, for measuring a shape of driven teeth that are formed on an axial end face of a vehicle hub unit and that are meshed with drive teeth of a constant velocity joint, characterized by comprising:
    meshing the reference teeth of the reference setting tool according to claim 2 with the driven teeth of the vehicle hub unit;
    setting a measurement reference position using the reference surface of the reference setting tool; and
    removing the reference setting tool from the vehicle hub unit, and measuring a shape of the driven teeth using the measurement reference position as a reference.

11. The reference setting tool according to claim 1, wherein the reference surface of the reference setting tool includes a second reference surface formed of a cylindrical surface centering on a central axis that is a center of the circular ring along which the reference teeth are aligned.

12. The reference setting tool according to claim 11, wherein the reference surface is utilized as a measured surface of which a shape is measured by a measuring tool with the driven teeth in mesh with the drive teeth of the constant velocity joint.

13. A shape measuring device for a side face spline, the shape measuring device measuring a shape of driven teeth that are formed on an axial end face of a vehicle hub unit and that are meshed with drive teeth of a constant velocity joint, comprising:
    the reference setting tool according to claim 11; and
    a measuring unit that sets a measurement reference position using the reference surface with the reference teeth of the reference setting tool in mesh with the driven teeth of the vehicle hub unit, and that measures a shape of the driven teeth using the measurement reference position as a reference.

14. A shape measuring method for a side face spline, for measuring a shape of driven teeth that are formed on an axial end face of a vehicle hub unit and that are meshed with drive teeth of a constant velocity joint, characterized by comprising:

meshing the reference teeth of the reference setting tool according to claim 11 with the driven teeth of the vehicle hub unit;

setting a measurement reference position using the reference surface of the reference setting tool; and removing the reference setting tool from the vehicle hub unit, and measuring a shape of the driven teeth using the measurement reference position as a reference.

15. The reference setting tool according to claim 1, wherein the reference surface is utilized as a measured surface of which a shape is measured by a measuring tool with the driven teeth in mesh with the drive teeth of the constant velocity joint.

16. A shape measuring device for a side face spline, the shape measuring device measuring a shape of driven teeth that are formed on an axial end face of a vehicle hub unit and that are meshed with drive teeth of a constant velocity joint, comprising:

the reference setting tool according to claim 15; and a measuring unit that sets a measurement reference position using the reference surface with the reference teeth of the reference setting tool in mesh with the driven teeth of the vehicle hub unit, and that measures a shape of the driven teeth using the measurement reference position as a reference.

17. A shape measuring method for a side face spline, for measuring a shape of driven teeth that are formed on an axial end face of a vehicle hub unit and that are meshed with drive teeth of a constant velocity joint, characterized by comprising:

meshing the reference teeth of the reference setting tool according to claim 15 with the driven teeth of the vehicle hub unit;

setting a measurement reference position using the reference surface of the reference setting tool; and removing the reference setting tool from the vehicle hub unit, and measuring a shape of the driven teeth using the measurement reference position as a reference.

18. A shape measuring method for a side face spline, for measuring a shape of driven teeth that are formed on an axial end face of a vehicle hub unit and that are meshed with drive teeth of a constant velocity joint, characterized by comprising:

meshing the reference teeth of the reference setting tool according to claim 15 with the driven teeth of the vehicle hub unit; and rotating the driven teeth about an axis of the vehicle hub unit, and measuring a shape of the reference surface of the reference setting tool.

19. A shape measuring device for a side face spline, the shape measuring device measuring a shape of driven teeth that are formed on an axial end face of a vehicle hub unit and that are meshed with drive teeth of a constant velocity joint, comprising:

the reference setting tool according to claim 1; and a measuring unit that sets a measurement reference position using the reference surface with the reference teeth of the reference setting tool in mesh with the driven teeth of the vehicle hub unit, and that measures a shape of the driven teeth using the measurement reference position as a reference.

20. A shape measuring method for a side face spline, for measuring a shape of driven teeth that are formed on an axial end face of a vehicle hub unit and that are meshed with drive teeth of a constant velocity joint, characterized by comprising:

meshing the reference teeth of the reference setting tool according to claim 1 with the driven teeth of the vehicle hub unit;

setting a measurement reference position using the reference surface of the reference setting tool; and removing the reference setting tool from the vehicle hub unit, and measuring a shape of the driven teeth using the measurement reference position as a reference.

* * * * *